Feb. 15, 1955 A. MACKMANN 2,701,973
VEHICLE WINDOW REGULATOR
Filed June 18, 1949 2 Sheets-Sheet 2
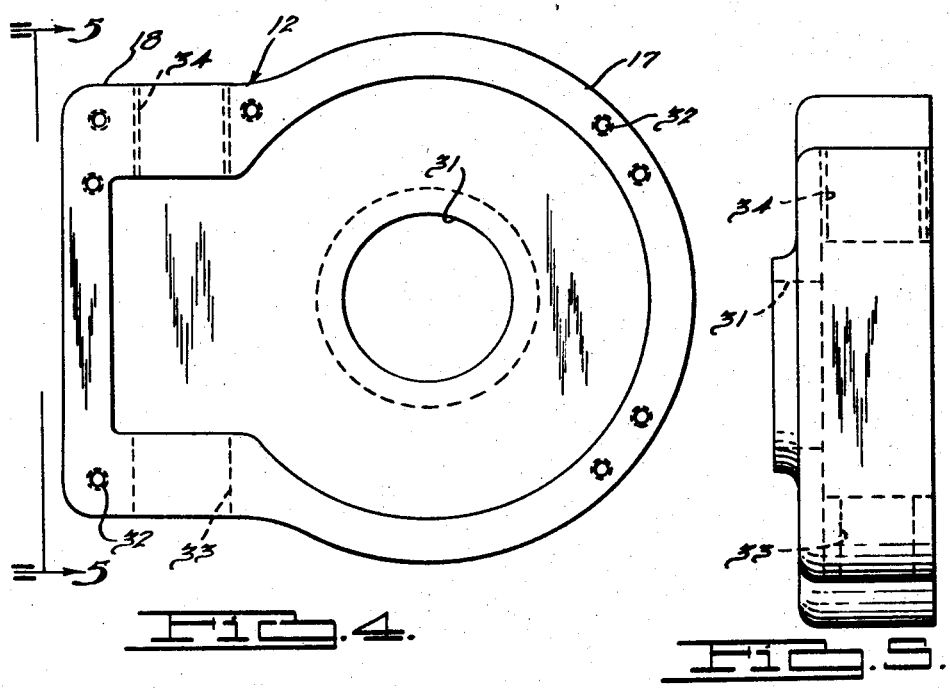
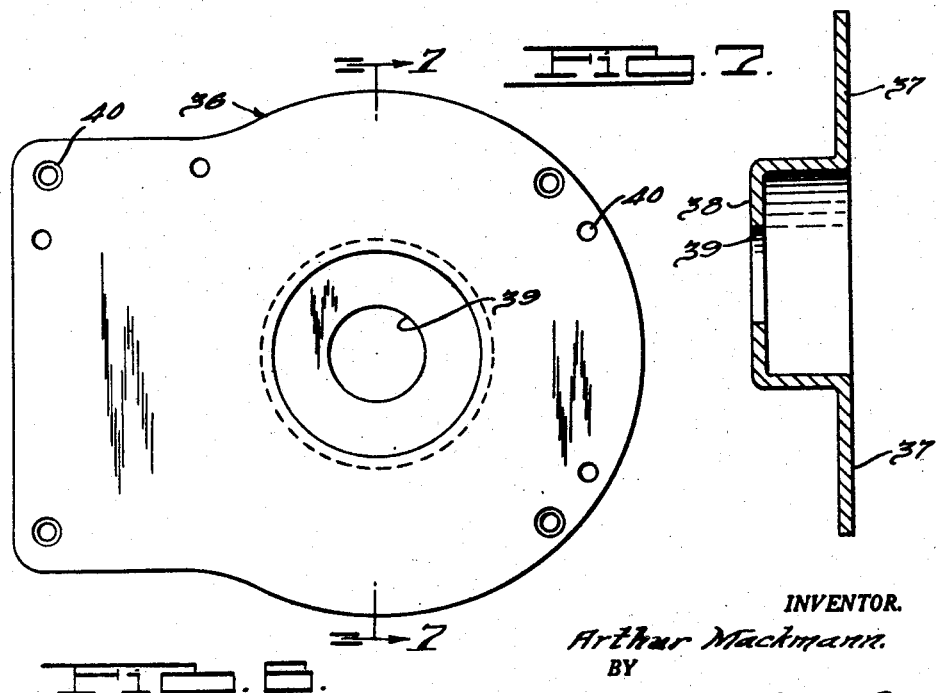
INVENTOR.
Arthur Mackmann.
BY
Harness, Dickey & Pierce.
ATTORNEYS.

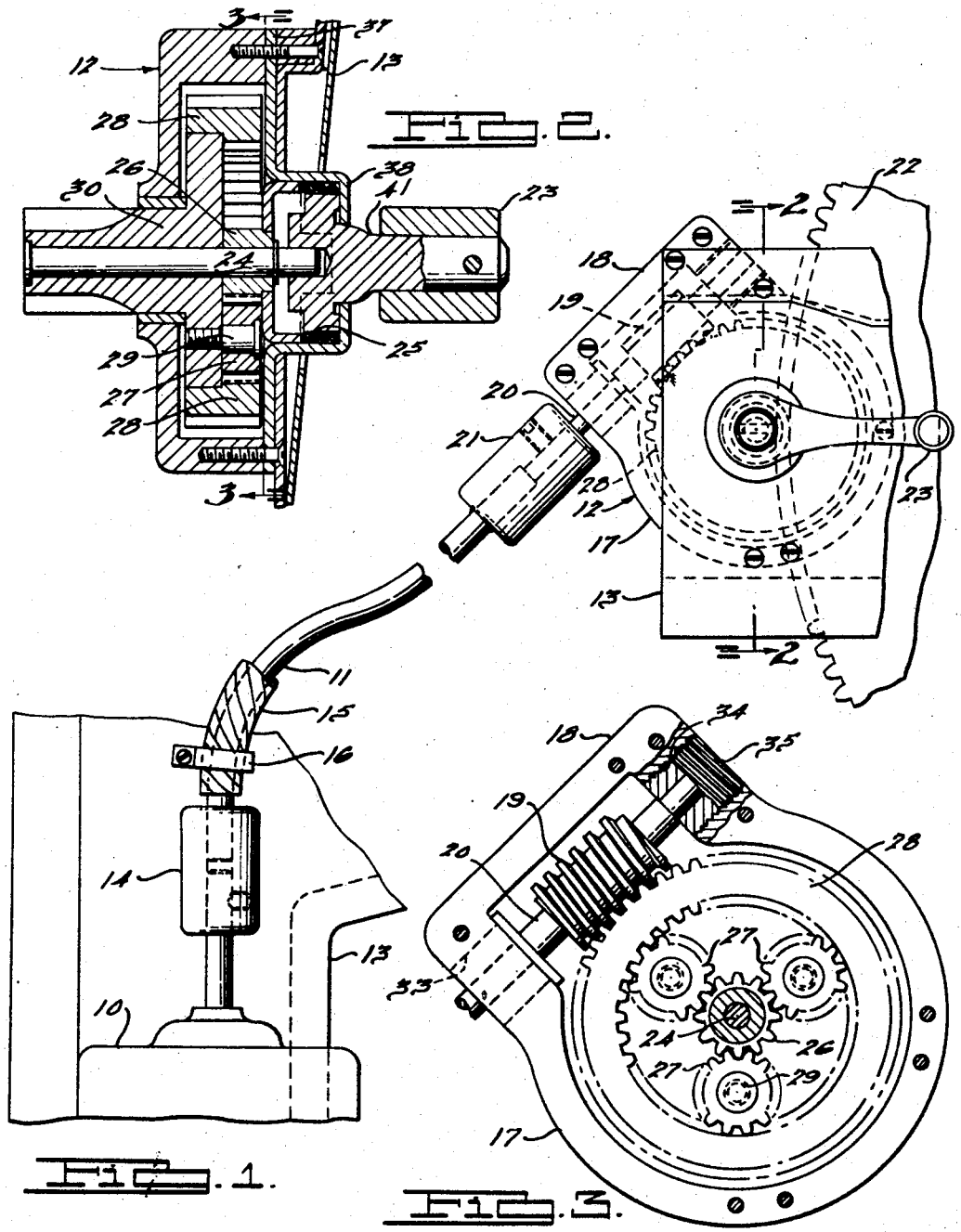

United States Patent Office 2,701,973
Patented Feb. 15, 1955

2,701,973

VEHICLE WINDOW REGULATOR

Arthur Mackmann, Chicago, Ill., assignor, by mesne assignments, to Hupp Corporation, Cleveland, Ohio, a corporation of Virginia Application June 18, 1949, Serial No. 99,928

2 Claims. (Cl. 74—626)

This invention concerns an apparatus for use in connection with regulation of vehicle windows and in particular relates to a compact unit package adapted to enclose the gear elements necessary for window operation by either manual means or power means.

There is known to the art vehicle window regulators which operate from both a motor driven mechanism and a hand operated mechanism. Similarly, there have been described declutching means which disengage the manually operated mechanism at the time the motor is operating. An example of such a gear system and declutching mechanism is illustrated in the accompanying drawings in order to show more clearly the type of gear system and declutching mechanism with which this invention is concerned.

One of the major problems encountered in the installation of window regulating equipment is that of space. This is particularly true in older cars which were designed in a manner to provide for the installation of hand operated window regulator equipment but were not designed with motor driven equipment in mind. Where it is desired to install such a power mechanism in a door frame it is necessary, for the devices known, to provide a space for the gear system, a space for the motor, and, further, to have the spaces in proper alignment to drive the gear system by the motor and connecting shaft. However, where cars are not designed for such mechanisms, they cannot, as a rule be provided with the known devices. Frequently there is space in a door; for example, near the bottom hinge, which is ample for a motor but such space is normally not in alignment with the usual manually operated device for a direct connection.

It is an object of the invention to provide in a vehicle window regulating apparatus a unit gear package adapted to include gear elements responsive to both manual operation and motor operation.

It is an object to provide means for actuating a window regulating gear system with a motor which is not in alignment with said system.

It is a further object to provide a gear package for use in a vehicle window regulating apparatus which is adapted for ready insertion in a door frame and adapted to engage a motor actuated shaft, to engage a hand operated crank shaft and to engage an element engaged with the window for movement therewith.

I have now found that the foregoing and related objects can be secured in an apparatus which comprises, in a preferred embodiment, the combination of a motor actuated flexible shaft and a gear package for use as an intermediate means in the transmission of movement from both the flexible shaft and a hand actuated shaft to a common element in a vehicle window regulating apparatus, wherein said package comprises a gear system adapted to engage said shafts and said element, a declutching means adapted to fix said hand actuated shaft against movement when said motor actuated shaft is in motion, and a unit housing compactly enclosing said gear system, wherein said housing comprises a substantially cylindrical portion enclosing said gear system and a substantially oblong portion mounted substantially tangentially to said cylindrical portion, wherein a wall of said cylindrical portion is provided with an opening adapted to receive the hand actuated shaft for engagement with said gears, and wherein said oblong portion is provided with an opening adapted to receive said flexible shaft for engagement with said gear system.

Other objects and features of novelty of the invention will be specifically pointed out or will become apparent when referring, for a better understanding of the invention, to the following description taken in conjunction with the accompanying drawings, wherein:

Fig. 1 is a view of elements of a window regulating apparatus embodying features of the present invention.

Fig. 2 is a sectional view of the gear package taken along the line 2—2 of Fig. 1.

Fig. 3 is a sectional view of the gear package taken along the line 3—3 of Fig. 2.

Fig. 4 is a plan view of the housing of the gear package.

Fig. 5 is a view of the housing taken along the line 5—5 of Fig. 4.

Fig. 6 is a plan view of the cover for the gear package.

Fig. 7 is a view of the cover taken along the line 7—7 of Fig. 6.

Referring more particularly to the drawings,

Figure 1 illustrates an embodiment of the invention and includes generally a motor 10, a flexible shaft 11 and a unit gear package 12. The motor 10 is positioned in a door frame 13 and is coupled to the flexible shaft by a suitable coupling 14. The shaft 11 may be provided with a flexible covering 15 which is attached to the door frame by a clamp 16. The use of the covering 15 is normally not necessary but may be used in some cases with advantage. The gear package 12 is a housing comprising a cylindrical portion 17 and an oblong portion 18, the latter positioned substantially tangentially to the cylindrical portion. The cylindrical portion of the package is adapted to enclose a planetary gear system and the oblong portion is adapted to enclose a worm gear 19 to cooperate with the planetary gears and with the flexible shaft. Cooperation between the worm gear 19 and the flexible shaft 11 is provided by the shaft 20 and the coupling 21. A gear segment 22, responsive to movement of the planetary gear system, is attached to the car window (not shown) for the raising and lowering of thew indow. Where the gear package of the invention is installed in vehicles already provided with a manually operated window adjusting apparatus the gear segment 22 may represent the particular means already present for transmitting the movement of the crank to the window and may also represent the "common element" of the window regulating apparatus to which movement is transmitted by either hand operation or motor operation.

Figure 2 and Figure 3 show in more detail a system of gears adapted to be used in connection with the present invention and illustrates the gear system as enclosed in a compact unit package in accordance with the principles of the invention.

In the figures a manually operated crank 23 and crank shaft 41 are attached to a pilot shaft 24 through a declutching mechanism 25. Such declutching mechanisms are well known to the art and need not be detailed in this specification. A pinion gear 26 is mounted on the pilot shaft 24 and three traveler gears 27 are mounted for rotation on the periphery of the pinion gear. The planetary gear system is completed by the spur gear 28 which has teeth on both the internal and external surfaces. The internal teeth are adapted to engage the traveler gears and the external teeth are adapted to engage the worm gear 19 positioned in the oblong portion of the package and attached to the flexible shaft 11 via the shaft 20. Each of the traveler gears may be fixed by a stub shaft 29 or other suitable fastening means to a spider member 30 which is mounted concentric to the pilot shaft.

Thus, a turning of the crank shaft will cause a movement of the traveler gears in a planetary motion about the pinion gear and consequently a rotation of the spider member. A sector gear 22 or other element of the regulating mechanism of a vehicle window suitable for acting in common for the transmission of movement from both the motor and the hand crank can be engaged with the spider member. Such a movement of the traveler gears will not induce a motion of the spur gear because of the fact that the former are free to move while the latter is fixed through the relatively high resistance to movement of the worm gear 19. Conversely if the motor is used to adjust the car window a movement of the shaft 11 turns the worm gear which induces a motion in the spur gear and consequently in the traveler gears, the spider member, and the common element such as the sector gear. In this case the freedom of movement of the traveler gears is such that there is no movement in the pinion gear because of the relatively high resistance of the declutching mechanism. Thus, the car window may be raised or lowered by the hand crank without any movement of the flexible shaft to the motor and conversely the window may be raised or lowered by the motor without any movement of the hand crank. Similarly, the window cannot be moved, and in particular cannot be opened by the application of a direct force on the window itself. Such a force would be applied against the sector gear or equivalent element of the window regulating apparatus and thus to the spider member and traveler gears. The latter, however, are fixed against such movement by the declutching mechanism and the worm gear as described above.

Figs. 4 and 5 show the housing 12 of the present invention as consisting of a substantially cylindrical portion 17 and a substantially oblong portion 18 positioned tangentially to the cylindrical portion. The cylindrical portion has an opening 31 to receive the spider member and is provided with a number of openings 32 for screws, bolts or other fastening devices. The oblong portion has an opening 33 to receive one end of the shaft 20 and an oppositely disposed opening 34 provided with an adjustable threaded bearing 35. It will be apparent that the coupling 21 may join the flexible shaft with the shaft 20 either inside or outside the housing and therefore it can be said that the opening 33 receives the shaft 20 or equivalently, that the opening 33 receives the flexible shaft.

Similarly, it will be apparent that each of the oppositely disposed openings 33 and 34 of the housing may be adapted to receive a number of types of bearings. For example, the opening 34 may be similar to the opening 33. Similarly the worm gear 19 and the shaft 20 may be fitted into the oblong portion of the housing in a number of ways. For example, the worm portion 19 may be a separate piece from the shaft 20 and may be fixed to the latter by a cross pin. The threaded portion may be of any suitable length and may extend from one opening to the other. Where the threaded portion 19 is made separately from the shaft 20 it is preferred that each end of the threaded portion consist of a small hub which fits into the openings 33 and 34 and acts as a bearing surface. In this latter case the thread of opening 34 may be eliminated.

Figs. 6 and 7 illustrate a plate or cover 36 for the gear package which may be flat or may be in the form illustrated in Fig. 7. The latter form is preferred since it permits the declutching mechanism 25 to be enclosed in the gear package. As illustrated the plate or cover 36 consists of base portions 37 which fit against the base portion of the gear package 12; an elevated cylindrical portion 38 which is provided with an opening 39 to permit the passage of the crank shaft 41 through the gear package; and a number of openings 40 for bolts or other fastening devices.

As indicated above the gear package of the present invention can be installed not only in newly built cars designed to receive it but also in older cars which are provided with only a hand operated regulator. Since these older cars normally do not have sufficient space within the car frame at a point suitable for a direct rigid shaft connection between the motor and gear package the flexible shaft of the invention can be used with the gear package and the motor can be placed in any position within the door frame where space is adequate.

It is preferred that window regulators be responsive to both automatic and manual operation and that the declutching mechanisms of the art be used to avoid movement of the hand crank when the automatic system is in operation. For this reason a preferred embodiment of the present invention includes within the gear package space for such a declutching mechanism.

Although my invention is not concerned with any particular de-clutching mechanism, particularly since such mechanisms are normally present in manually operated window regulators when the apparatus of my invention is installed; the type which is best known and particularly adaptable comprises a spring positioned around and concentric to the hand crank shaft. The wire ends of the spring are bent radially inwardly to engage a portion of the crank shaft in a manner such that a turning of the hand crank in either direction causes the spring to tighten around the shaft. However, if power is applied to the shaft via the sun pinion of a planetary gear system, the spring provides sufficient "frictional drag" to cause the traveler gears of the gear system to spin without motion of the sun pinion. This type of declutching mechanism has been used in vehicles practically since the adoption of window regulators. Their purpose when first used was to prevent the vehicle window from being opened from the outside by a downward push on the top of the window.

I claim:

1. A window regulator of the linkage type comprising a gear adapted to be connected to said linkage, an electric motor for operating said gear, a handle for operating the gear independently of said motor, a power transmission unit interposed between said gear and the motor and handle, an output pinion in said unit engageable with said gear, a manual input shaft rotatable by said handle, a sun gear in said unit, a de-clutching mechanism interposed between said sun gear and manual input shaft whereby rotary power may be transmitted only from said shaft to the sun gear, a power input shaft in said unit driven by said motor, a worm on said power input shaft, a ring gear having external teeth meshing with said worm, said sun and ring gears being freely rotatable with respect to said output pinion, internal teeth on said ring gear, a planetary gear meshing with said sun gear and said internal teeth, means connecting said planetary gear to said output pinion, a unitary housing for said power transmission unit, said housing comprising a flat circular portion enclosing said ring gear, sun gear, and planetary gear, a bearing on said circular portion for said output pinion, an enclosure on said circular portion for said declutching mechanism, and an oblong housing portion integral with said circular portion and generally tangent thereto, said oblong portion having bearing supports for said power input shaft.

2. The combination according to claim 1, further provided with a pilot pin held by said output pinion, said pilot pin supporting said sun gear and said manual input shaft.

References Cited in the file of this patent

UNITED STATES PATENTS

| Number | Name | Date |
|---|---|---|
| 1,157,307 | Henderson | Oct. 19, 1915 |
| 1,263,125 | Sawyer | Apr. 6, 1918 |
| 1,265,269 | Sipp | May 7, 1918 |
| 1,390,867 | Barrett | Sept. 13, 1921 |
| 1,996,579 | Johnstone et al. | Apr. 2, 1935 |
| 2,001,758 | Zwierzina | May 21, 1935 |
| 2,104,582 | Carlson | Jan. 4, 1938 |
| 2,109,362 | Tollison | Feb. 22, 1938 |
| 2,300,576 | Klein | Nov. 3, 1942 |
| 2,370,976 | Lear | Mar. 6, 1945 |
| 2,420,552 | Morrill | May 13, 1947 |
| 2,437,646 | Matulaitis et al. | Mar. 9, 1948 |
| 2,481,477 | Perry | Sept. 6, 1949 |
| 2,621,541 | Rath | Dec. 16, 1952 |

FOREIGN PATENTS

| 360,041 | Italy | June 10, 1938 |